Sept. 9, 1941. A. GULOW 2,255,662
BEARING
Filed Dec. 31, 1937 2 Sheets-Sheet 1
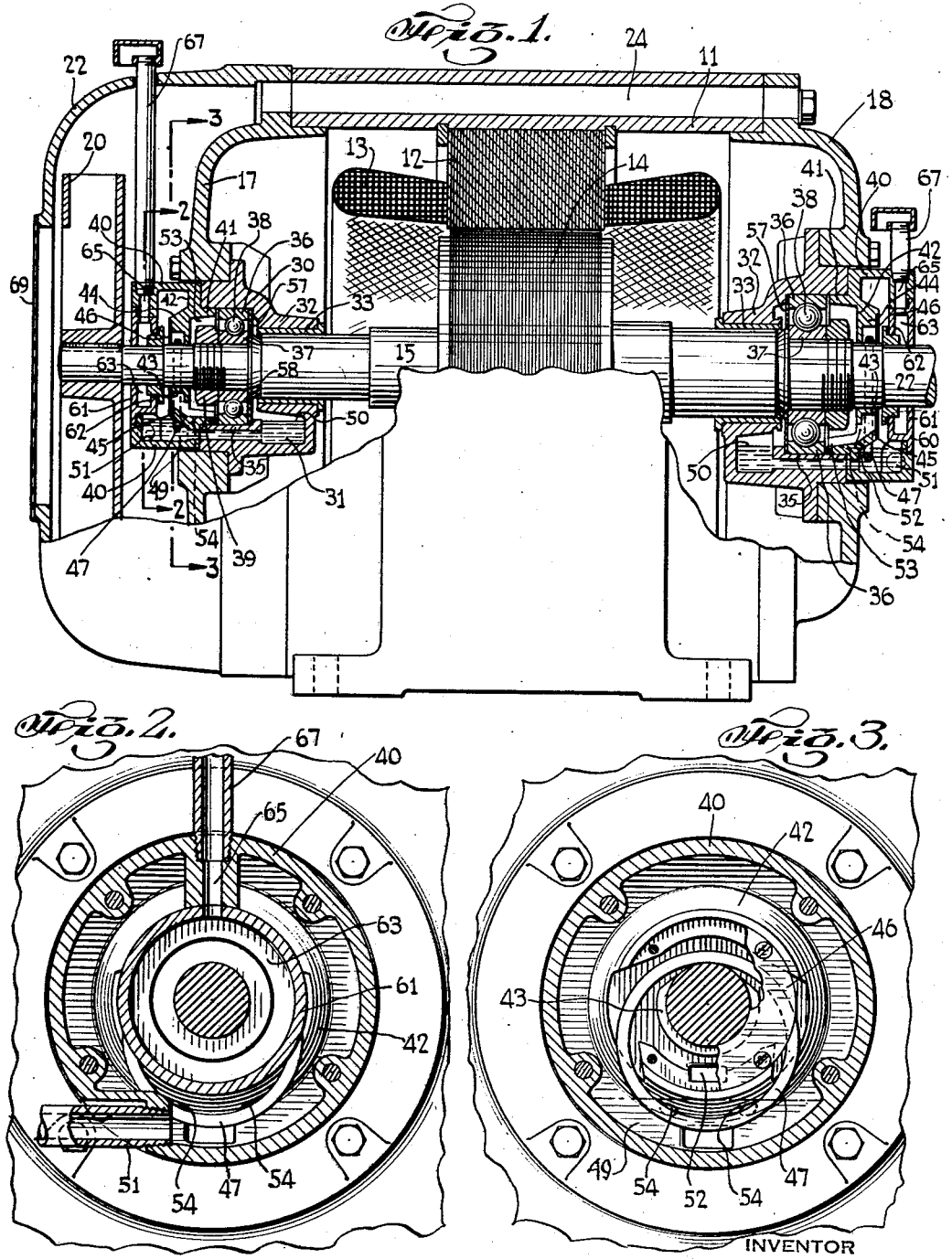
INVENTOR
ANDERS GULOW
BY S. Michael Pincles
ATTORNEY

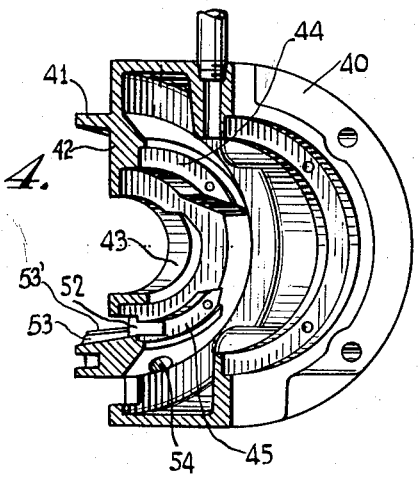
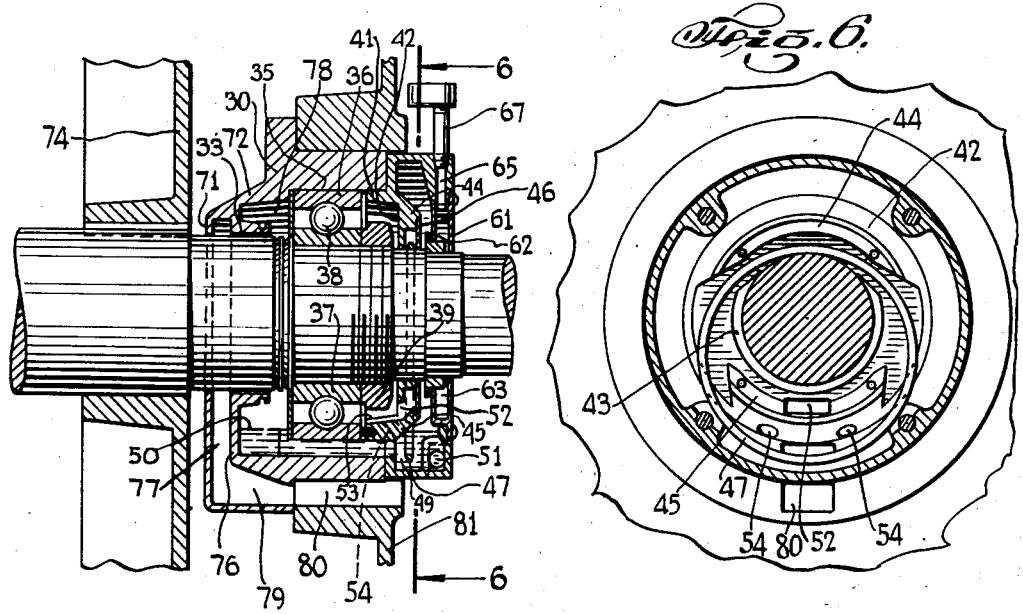
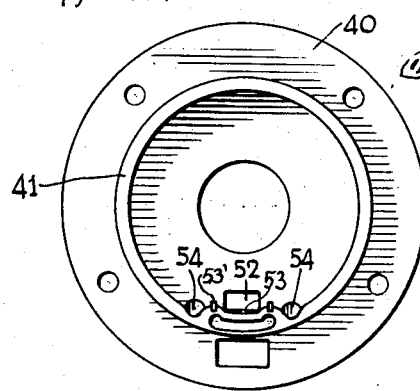

Patented Sept. 9, 1941

2,255,662

UNITED STATES PATENT OFFICE 2,255,662

BEARING

Anders Gulow, Arlington, N. J., assignor to Continental Electric Company, Inc., Newark, N. J., a corporation of New Jersey Application December 31, 1937, Serial No. 182,751

6 Claims. (Cl. 308—187)

This invention relates to bearings and more particularly to bearings lubricated by oil or similar lubricants.

Among the objects of the invention is an improved bearing structure in which efficient lubrication of the effective bearing surfaces is secured by gravity feed of oil supplied by an oil ring or similar oil carrier without causing break-up, churning or atomization of the oil.

The foregoing and other objects of the invention will be best understood from the following description of exemplifications thereof, reference being had to the accompanying drawings, in which Fig. 1 is a cross sectional view through an electric motor equipped with bearings exemplifying the invention;

Fig. 2 is a vertical sectional view through the bearing structure facing the fan of the motor along line 2—2 of Fig. 1;

Fig. 3 is a vertical sectional view of the bearing structure along line 3—3 of Fig. 1;

Fig. 4 is a perspective sectional view of the bearing structure shown in Figs. 2 and 3;

Fig. 5 is a vertical sectional view of another bearing structure exemplifying the invention;

Fig. 6 is a vertical sectional view along line 6—6 of Fig. 5; and

Fig. 7 is an elevational view of the inner side of the oil ring cartridge shown in Figs. 1 and 5.

Although the bearings of the invention are useful in all applications where oil lubricated bearings are required, they will be described as applied to a totally enclosed, self ventilated electric motor intended for operation in gaseous atmospheres and designed to stand the shock of an internal explosion, commonly known as explosion proof motors.

As shown in Fig. 1, such motor comprises a stator frame 11 in which is mounted a laminated stator core 12 provided with stator windings 13. An armature core 14 cooperating with the stator is mounted on a shaft 15 which revolves in two bearing structures supported in bearing brackets 17, 18 forming end plates secured to the opposite sides of the stator frame 11 and constituting therewith an enclosure around the interior motor parts. A cooling fan 20 mounted on the projecting stub end of the shaft 15 behind a fan cover 22 sends a stream of cooling air through the longitudinal cooling ducts 24 provided in the stator frame so as to dissipate the heat evolved in the enclosed motor parts during their operation. The other shaft end 22 leads to pulleys or other mechanism which are driven by the motor.

The general arrangement of such motors is well known and they have been in general use for many years past.

In the operation of motors of the type described above and in various other revolving structures exposed to severe operating conditions, the bearing structure for mounting revolving shafts has always presented a critical problem.

Although prior oil lubricated anti-friction bearings using oil rings or similar oil carriers for lifting the oil fed to the anti-friction bearing surfaces proved a partial solution of this problem, the operation of the available bearings of such type is connected with various troubles.

Thus, the revolving shaft element on which the oil ring deposits the oil lifted from the oil reservoir of the bearing acts as an oil flinger and imparts to the circumferentially accelerated oil particles centrifugal forces which break up and atomize the oil and form an oil spray and oil fog in the bearing housing. Since fans, pulleys or similar revolving mechanical structures located in the vicinity of the bearing create suction forces acting on the exterior walls of the bearing housing, the oil fog or spray is sucked into the space on the exterior of the bearing housing and brings about the formation of oil deposits on motor windings, pulleys, belts and similar operating elements from which oil must be kept away.

In addition, such suction forces acting on the exterior of the wall housing produce a sub-atmospheric pressure or partial vacuum in the interior of the bearing housing, bringing about a rise of the level of the oil which is usually supplied from an oil cup designed to maintain in the oil reservoir a predetermined level as long as normal atmospheric pressure exists in the bearing housing. As a result, the oil floods the effective bearing surfaces and, in the case of anti-friction bearings, the churning action of the revolving balls passing through the oil body breaks up, aerates and heats the oil, and causes it to foam. Such heated aerated foaming oil loses a great deal of its lubricating qualities and as a result more heat is developed in the bearing. The oil in the bearing housing is thus subjected to cumulative deteriorating actions which progressively reduce its effectiveness as a lubricant and brings about operating troubles.

The rise of the oil level due to sub-atmospheric pressure created in the bearing housing also causes trouble because on stopping the operation of the shaft, the oil suspended between the balls, the ball races and on the interior walls of the bearing housing adds to the oil volume, thus further raising its level and aggravating the deterioration of the oil when the rotation of the shaft is again started.

These and other difficulties encountered in the operation of prior bearings are overcome by the bearing arrangement of the invention embodied in its exemplifications shown in the drawings and described hereinafter.

In the bearings of the invention in which all parts are arranged to permit easy dismantling and assembling of the operating structure, the oil ring, oil chain or similar oil carrier which rides on the shaft is confined in a channel which permits the oil ring surrounding the shaft element on which it rides to lift the oil while preventing splashing and leakage of the oil. The oil ring compartment is associated with oil removing means arranged to remove the oil deposited on the shaft element before the oil acquires an acceleration which would fling it from the shaft and bring about its atomization.

The oil removing means are so arranged and associated with the revolving shaft element and the oil ring as to assure that by a relatively slow gravity flow of the oil, the effective bearing surfaces of the bearing are supplied with the amount of oil required for efficient lubrication while preventing accumulation of an excess of oil along the bearing surfaces which might cause progressive deterioration of the oil.

The creation of pressure unbalancing conditions, such as partial vacuum, in the oil containing interior of the bearing housing and an excessive rise of the oil level with resulting aeration of the oil is prevented by interposing between the oil holding interior of the bearing housing and its exterior which is exposed to pressure unbalancing forces a pressure balancing compartment which maintains between the oil holding interior of the bearing housing and its exterior a pressure balancing barrier which assures the maintenance of the desired oil level in the oil reservoir.

The elements of the bearing structure are so arranged and shaped as to segregate the spaces of the oil holding interior of the bearing housing from the exterior by oil seal members which prevent creepage and escape of oil from the interior of the bearing housing to its exterior surroundings from which oil should be kept away.

Bearing structures exemplifying the invention as applied to the motor shown in Fig. 1 and its generally similar modification shown in Fig. 5 will now be described.

As shown in Fig. 1 and the detail views of Figs. 2 to 4 illustrating the bearing structure mounted in the bearing bracket 17 facing the fan 20, it comprises a bearing housing 30 forming in its lower portion a reservoir 31 for oil or similar lubricant and has an exterior flange fitting into the bracket opening and an inner flange 32 holding a sleeve 33 surrounding the shaft. As in the generally similar bearing housings of the bearing structure of the other shaft end 22 and of Fig. 5, in the interior of the bearing housing is provided a bearing frame ring 35 in which is mounted an anti-friction bearing formed of an outer race 36 and an inner race 37, and balls 38 or similar anti-friction members running between the two race members. The bearing is held in position by a nut 39 screwed over an adjacent threaded portion of the shaft to clamp the inner ball race against the shoulder formed on the shaft.

The other side of the bearing housing is enclosed by a collar-like oil ring cartridge structure 40 which has an inwardly extending cylindrical flange 41 fitting into the frame opening of the bearing housing 30, and an adjoining partition wall member 42 surrounding the shaft. The outer side of the partition wall member 42 is provided with an inwardly projecting oil deflecting or removing segment 43 embracing the lower side of the shaft and two segmental wall projections 44, 45 bounding an oil ring compartment enclosed on the outer side by a closure plate 46 surrounding the shaft and suitably secured to wall projections 44, 45. An oil ring 47 running on the upper surface portion of the shaft section exposed between the edges of the oil removing segment 43 and extending through the lateral openings between the wall projections 44, 45 of the oil ring compartment into oil reservoir extension 49 formed in the bottom portion of the cartridge structure 40 lifts oil and deposits it on the exposed shaft section extending through the oil compartment between the edges of the oil removing segment 44. As shown in Figs. 3 and 4, the upper edges of the oil removing segment 43 which partially surrounds the shaft forms beveled wedges positioned sufficiently close to the surface of the revolving shaft section on which the oil ring deposits the oil so as to remove the oil deposited by the oil ring 47 from the revolving shaft section.

The outer surface of the oil removing segment 43 is arranged and located above the lower segmental wall projection 45 so as to cause the oil removed by the wedges of the oil removing segment 43 to flow by gravity into an oil pocket 52 provided in the center of the lower wall projection 45. A channel 53 extending from the oil pocket 52 along the adjacent bottom portion of the flange wall 41 facing the outer bearing race 36 delivers thereto the amount of oil required for securing efficient lubrication of the effective bearing surfaces. As shown in Figs. 4 and 7, the oil channel 53 is bordered by side walls 53' rising above the adjacent surface portion of the flange wall 41 which forms on both sides of the channel 53 pockets into which the excess of oil rising above the upper edges of the channel walls 53' overflows, and the so overflowing excess of oil is returned through holes 54 extending through the bottom of the flange wall into the oil reservoir extension 49 in which the oil is maintained at a level lower than the lowermost point reached by the balls running on the outer ball race 36. The side walls of the oil channel 53 may be arranged so as to permit the adjustment of their overflow level and thus adjust the amount of oil supplied to the effective bearing surfaces in accordance with the various operating conditions, such as the character of the oil and the prevailing temperatures.

This oil ring arrangement confines the operation of the oil-lifting action of the oil ring to a relatively small oil ring compartment. The oil deposited by the revolving oil ring on the exposed upper shaft section is collected from the revolving shaft by one or the other wedge-shaped edges of the oil deflecting segment 43 before it acquires any substantial circumferential velocity so as to cause it to flow slowly by gravity into the oil pocket 52, from whence it flows through the upper channel 53 to the outer ball races, leaving therein enough oil for efficient lubrication of the bearing surfaces while the excess of oil is returned to the oil well 49. In this way, very efficient lubrication of the effective bearing surfaces with relatively cool, slowly flowing oil is secured. At the same time, accumulation of an excess of oil in the space through which the balls are running is prevented and the break-up and heating of the oil through the churning action of balls running through oil pools is eliminated.

The oil in the oil reservoir is maintained at the required maximum level region indicated at 50 by a conventional oil cup, not shown, which is connected through a tube 51 to the bottom of the oil reservoir.

The annular channel-shaped oil ring compartment formed by the closure plate 46 around the portion of the oil ring extending over the shaft confines thus the flow of the oil within the compartment and prevents leakage of oil along the shaft.

In order to prevent the oil supplied to the bearing surfaces from creeping beyond the bearing surfaces, a stationary annular oil seal ring 57 is placed between the outer race 36 and the adjacent bearing frame portion so as to form with the edge of the revolving inner race an oil seal confining the oil within the bearing races. In addition, the shoulder portion 58 formed on the adjacent outer shaft section is provided with a conical surface so as to act as an oil flinger, throwing off by centrifugal action any oil particles reaching its surfaces and thus preventing oil from reaching the sleeve 33 of the bearing housing.

In a motor of the type shown in Fig. 1, external suction forces are created by the fan at the side wall of the bearing housing facing the fan, and such suction forces may also be created by a revolving pulley or similarly acting mechanism mounted adjacent the bearing housing at the shaft end 22. In the case of a motor provided with an internally mounted fan, as shown in Fig. 5, such suction forces may be created on the exterior of both side walls of the bearing housing.

To prevent the creation of sub-atmospheric pressure in the oil compartment of the bearing housing by suction forces produced on the exterior of the bearing housing through fans or rotating fan-like structures, the side wall of the bearing housing exposed to the action of such suction forces is provided with a pressure balancing compartment which surrounds the shaft section extending through the side wall and is maintained at atmospheric pressure so as to act as a pressure balancing barrier interposed between the oil holding interior of the bearing housing and the external suction forces.

In the bearing structures shown in the drawings, the oil ring cartridge which is exposed to external suction forces tending to produce sub-atmospheric pressure in the interior of the oil holding bearing housing is provided with a shaft surrounding hollow side wall cover 60 having an outer wall 61 and an inner wall 62 forming around the projecting shaft a pressure balancing suction barrier compartment 63 interposed between the interior of the bearing housing and the exterior space. The desired pressure is maintained in the pressure balancing compartment by connecting it, for instance, in the way shown in the drawings, through a passage 65 in the adjacent wall section of the cartridge 40 to an air duct 67 leading to a space maintained at the required pressure which, in the case shown in the drawings, is the exterior atmospheric pressure to which the oil cup which maintains the desired oil level in the bearing housing is exposed.

The inner annular wall 62 of the pressure balancing compartment 63 forms with a projecting ridge of a flinger ring mounted on the shaft section surrounded by the wall 62 an oil seal which prevents the creepage or escape of oil from the bearing housing.

As shown in Fig. 5 the side wall 71 of the bearing housing 72 surrounding the shaft 73 on which a suction creating fan 74 is mounted may be provided with an inner wall 76 to form a pressure balancing compartment 77 interposed along the shaft between the exterior of the housing which is exposed to pressure unbalancing forces and the interior space 78 of the bearing housing in which the oil is to be maintained at the desired level 50. The pressure balancing compartment 77 is suitably connected to a space maintained at the required balancing pressure, for instance, by a duct 79 leading from the bottom of the compartment 77 through a passage 80 in the bearing bracket 81 exposed to the atmospheric pressure at which the oil in the bearing housing is to be maintained.

The various elements of the bearing structures exemplifying the invention described above are designed and arranged to eliminate the troubles encountered in the operation of prior oil lubricated bearings.

The oil ring which rides on the shaft and lifts the oil is confined in a groove extending around the shaft which is so arranged as to prevent leakage of oil along the shaft, while depositing on the shaft a continuous supply of cool oil lifted from the oil reservoir without disturbing or splashing the oil in the reservoir. The oil in the reservoir will thus remain quiet, permitting impurities to settle on the bottom, and only clean cool oil will be supplied by the oil rings to the bearing surfaces.

The oil removing element is so arranged in relation to the shaft and the associated elements of the bearing structure as to remove the oil from the shaft on which the oil is deposited before the rotation of the shaft is able to impart to the deposited oil an acceleration that might cause break-up or atomization of the oil through centrifugal forces imparted by the rotation of the shaft. Either one of the wedge-shaped edges of the oil removing element removes and collects the oil from the shaft, depending on the direction of the rotation of the shaft. The oil removed and collected from the shaft flows by gravity into a pocket, from which it is guided through a channel of predetermined height, to the bearing so as to supply oil to the bearing at a predetermined level at which efficient lubrication of the effective bearing surfaces is secured.

Adjustable side walls of the channel permit the control of the level of the oil supplied to the effective bearing surfaces. The excess of oil reaching the channel is returned by gravity flow to the reservoir wherein it cools and settles. Thus, all the oil deposited on the shaft flows slowly down by gravity feed from the shaft and only sufficient oil is led to the bearing surfaces to secure effective lubrication while the remainder of the oil returns slowly by gravity to the oil reservoir.

The side wall sections of the housing through which the shaft projects are arranged to form pressure control compartments surrounding the shaft which are interposed between the interior oil reservoir space of the bearing housing and the exterior of the housing. The pressure balancing compartment interposed between the interior oil reservoir space of the bearing housing and the exterior space which is exposed to variable pressure conditions is connected through a duct leading to the exterior of the bearing housing to a space maintained at a desired predetermined pressure so as to assure that in the interior oil reservoir space of the housing, the pressure is maintained within a predetermined range required to maintain the level of oil within a predetermined range at which effective oil lubrication is secured. The individual sections of the bearing housing surrounding the shaft are subdivided by partitions surrounding the shaft arranged so as to provide clearance seals for preventing escape of oil particles along the shaft, without resort to seals of felt or the like.

The elements associated with the operation of the oil ring including the removing or collecting means as well as the oil guide means to the bearing are combined into a unitary structure forming a removable wall section of the housing permitting removal of the oil ring, together with the elements associated with its operation, without disturbing the other parts of the bearing housing structure. Easy and simple assembly and dismantling of the bearing structure is thus made possible.

I claim:

1. In a bearing structure for a revolving shaft, a bearing housing having in its interior a liquid lubricant reservoir, an anti-friction bearing for said shaft having a plurality of anti-friction members surrounding said shaft and located in said housing above the level of said lubricant, a hollow endless lubricant carrier having a portion immersed in said lubricant and a portion held in engagement with a shaft portion for lifting and depositing lubricant from said reservoir on said shaft portion, and collecting means including a deflecting member having an edge portion extending through said hollow carrier along and sufficiently close to the surface of the shaft portion embraced by said carrier for removing from said shaft lubricant deposited thereon before it acquired from the revolving shaft centrifugal forces sufficient to effectively pull deposited lubricant off the shaft and disperse the pulled-off lubricant in the surrounding bearing interior, and guide means for guiding removed lubricant to anti-friction members of said bearing located below the shaft, said anti-friction members constituting the sole support for the shaft portion extending through the interior of said bearing structure so that said deflecting member shall remain wholly out of pressure contact in relation to said shaft.

2. In a bearing structure for a revolving shaft, a bearing housing having in its interior a liquid lubricant reservoir, an anti-friction bearing for said shaft having a plurality of anti-friction members surrounding said shaft and located in said housing above the level of said lubricant, a hollow endless lubricant carrier having a portion immersed in said lubricant and a portion held in engagement with a shaft portion for lifting and depositing lubricant from said reservoir on said shaft portion, and collecting means including a deflecting member having an edge portion extending through said hollow carrier along and sufficiently close to the surface of the shaft portion embraced by said carrier for removing from said shaft lubricant deposited thereon before it acquired from the revolving shaft centrifugal forces sufficient to effectively pull deposited lubricant off the shaft and disperse the pulled-off lubricant in the surrounding bearing interior, and guide means for guiding removed lubricant to anti-friction members of said bearing located below the shaft including a channel member maintaining the lubricant within a predetermined level range below the upper level of the lowermost anti-friction members of the bearing, said anti-friction members constituting the sole support for the shaft portion extending through the interior of said bearing structure so that said deflecting member shall remain wholly out of pressure contact in relation to said shaft.

3. In a bearing structure for a revolving shaft, a bearing housing having in its interior a liquid lubricant reservoir, an anti-friction bearing for said shaft having a plurality of anti-friction members surrounding said shaft and located in said housing above the level of said lubricant, a hollow endless lubricant carrier having a portion immersed in said lubricant and a portion held in engagement with a shaft portion for lifting and depositing lubricant from said reservoir on said shaft portion, and collecting means including a deflecting member having an edge portion extending through said hollow carrier along and sufficiently close to the surface of the shaft portion embraced by said carrier for removing from said shaft lubricant deposited thereon before it acquired from the revolving shaft centrifugal forces sufficient to effectively pull deposited lubricant off the shaft and disperse the pulled-off lubricant in the surrounding bearing interior, and guide means for guiding removed lubricant to anti-friction members of said bearing located below the shaft including a channel member maintaining the lubricant within a predetermined level range below the upper level of the lowermost anti-friction members of the bearing, said anti-friction members constituting the sole support for the shaft portion extending through the interior of said bearing structure so that said deflecting member shall remain wholly out of pressure contact in relation to said shaft, said collecting means and said guide means constituting a detachable shaft-surrounding bearing-housing section having a groove within which said lubricant carrier revolves.

4. In a bearing structure for a revolving shaft, a bearing housing having in its interior a liquid lubricant reservoir, an anti-friction bearing for said shaft having a plurality of anti-friction members surrounding said shaft and located in said housing above the level of said lubricant, said housing having border portions surrounding said shaft and forming with the facing portions of said shaft clearance seals interposed between the interior and exterior of the housing, a hollow endless lubricant carrier having a portion immersed in said lubricant and a portion held in engagement with a shaft portion for lifting and depositing lubricant from said reservoir on said shaft portion, and collecting means including a deflecting member having an edge portion extending through said hollow carrier along and sufficiently close to the surface of the shaft portion embraced by said carrier for removing from said shaft lubricant deposited thereon before it acquired from the revolving shaft centrifugal forces sufficient to effectively pull deposited lubricant off the shaft and disperse the pulled-off lubricant in the surrounding bearing interior, and guide means for guiding removed lubricant to anti-friction members of said bearing located below the shaft including a channel member maintaining the lubricant within a predetermined level range below the upper level of the lowermost anti-friction members of the bearing, said anti-friction members constituting the sole support for the shaft portion extending through the interior of said bearing structure so that said deflecting member shall remain wholly out of pressure contact in relation to said shaft, said collecting means and said guide means constituting a detachable shaft-surrounding bearing-housing section having a groove within which said lubricant carrier revolves, said detachable bearing-housing section having a hollow barrier compartment provided with inner and outer wall portions having edges surrounding and extending sufficiently close to said shaft and so arranged and interposed between the interior reservoir space and the space on the exterior of said housing as to maintain under varying pressure conditions on the exterior of said housing predetermined equalized pressure conditions between said reservoir space and the space on the exterior of said housing.

5. In a bearing structure for a revolving shaft extending through the interior of a closed casing structure, a bearing housing for said shaft arranged to form a part of said casing structure and having in its interior a liquid lubricant reservoir, an anti-friction bearing for said shaft having a plurality of anti-friction members surrounding said shaft and located in said housing above the level of said lubricant, said housing having border portions surrounding said shaft and forming with the facing portions of said shaft clearance seals interposed between the interior and exterior of the housing, a hollow endless lubricant carrier having a portion immersed in said lubricant and a portion held in engagement with a shaft portion for lifting and depositing lubricant from said reservoir on said shaft portion, and collecting means including a deflecting member having an edge portion extending through said hollow carrier along and sufficiently close to the surface of the shaft portion embraced by said carrier for removing from said shaft lubricant deposited thereon before it acquired from the revolving shaft centrifugal forces sufficient to effectively pull deposited lubricant off the shaft and disperse the pulled-off lubricant in the surrounding bearing interior, and guide means for guiding removed lubricant to anti-friction members of said bearing located below the shaft, said anti-friction members constituting the sole support for the shaft portion extending through the interior of said bearing structure so that said deflecting member shall remain wholly out of pressure contact in relation to said shaft, said bearing housing structure having a housing section through which said shaft extends into the interior of said casing, said housing section having a hollow barrier compartment provided with spaced inner and outer wall barriers having edges surrounding said shaft and so arranged and interposed between its interior reservoir space and the interior of said casing structure as to maintain under varying pressure conditions in the interior of said casing predetermined equalized pressure conditions between said reservoir space and the space in the interior of said casing.

6. In a bearing structure for a revolving shaft, a bearing housing having in its interior a liquid lubricant reservoir and a housing section through which the shaft extends into said housing, an anti-friction bearing for said shaft having a plurality of anti-friction members surrounding said shaft and located in said housing above the level of said lubricant, a hollow endless lubricant carrier having a portion immersed in said lubricant and a portion held in engagement with a shaft portion for lifting and depositing lubricant from said reservoir on said shaft portion, and collecting means including a deflecting member having an edge portion extending through said hollow carrier along and sufficiently close to the surface of the shaft portion embraced by said carrier for removing from said shaft lubricant deposited thereon before it acquired from the revolving shaft centrifugal forces sufficient to effectively pull deposited lubricant off the shaft and disperse the pulled-off lubricant in the surrounding bearing interior, and guide means for guiding removed lubricant to anti-friction members of said bearing located below the shaft, said anti-friction members constituting the sole support for the shaft portion extending through the interior of said bearing structure so that said deflecting member shall remain wholly out of pressure contact in relation to said shaft, the housing section through which said shaft extends into the housing having a hollow barrier compartment provided with spaced inner and outer wall barriers having edges surrounding said shaft and so arranged and interposed between the interior reservoir space and the interior of the housing as to maintain under varying pressure conditions on the exterior of said housing predetermined equalized pressure conditions between said reservoir space and the space on the exterior of said housing.

ANDERS GULOW.